United States Patent
Carson et al.

(10) Patent No.: US 7,023,842 B2
(45) Date of Patent: Apr. 4, 2006

(54) SWITCH MODEL COMPONENT

(75) Inventors: Mark Carson, Belfast (GB); Andrew Brown, Carrickfergus (GB)

(73) Assignee: Nortel Networks Limited, St. Laurent (CA)

( * ) Notice: Subject to any disclaimer, the term of this patent is extended or adjusted under 35 U.S.C. 154(b) by 903 days.

(21) Appl. No.: 10/097,291

(22) Filed: Mar. 14, 2002

(65) Prior Publication Data

US 2003/0185376 A1    Oct. 2, 2003

(51) Int. Cl.
*H04L 12/50* (2006.01)

(52) U.S. Cl. .................. 370/388; 370/386; 370/387

(58) Field of Classification Search ............... 370/388, 370/386, 219, 220, 222, 223
See application file for complete search history.

(56) References Cited

FOREIGN PATENT DOCUMENTS

| EP | 1113627 A2 | 7/2001 |
| EP | 1148680 A2 | 10/2001 |
| WO | WO02/03594 A2 | 1/2002 |

*Primary Examiner*—Chi Pham
*Assistant Examiner*—Tito Pham
(74) *Attorney, Agent, or Firm*—Barnes & ThornburgLLP

(57) ABSTRACT

One aspect of the invention provides an apparatus for modelling a plurality of switching operations arranged in a plurality of switching stages. The apparatus comprises a respective switch stage component for each switching stage, and each switch stage component comprises a respective addressable switch state indicator for each switching operation associated with the respective switching stage. The values of the switch state indicators in a given switch stage component identify a respective switch state indicator in another switch stage component. The switch stage components are interconnected such that addressing a switch state indicator in one switch stage component causes the respective identified switch state indicator in another switch stage component to be addressed. In the preferred embodiment, each switch stage component comprises a respective Look-Up Table.

17 Claims, 8 Drawing Sheets

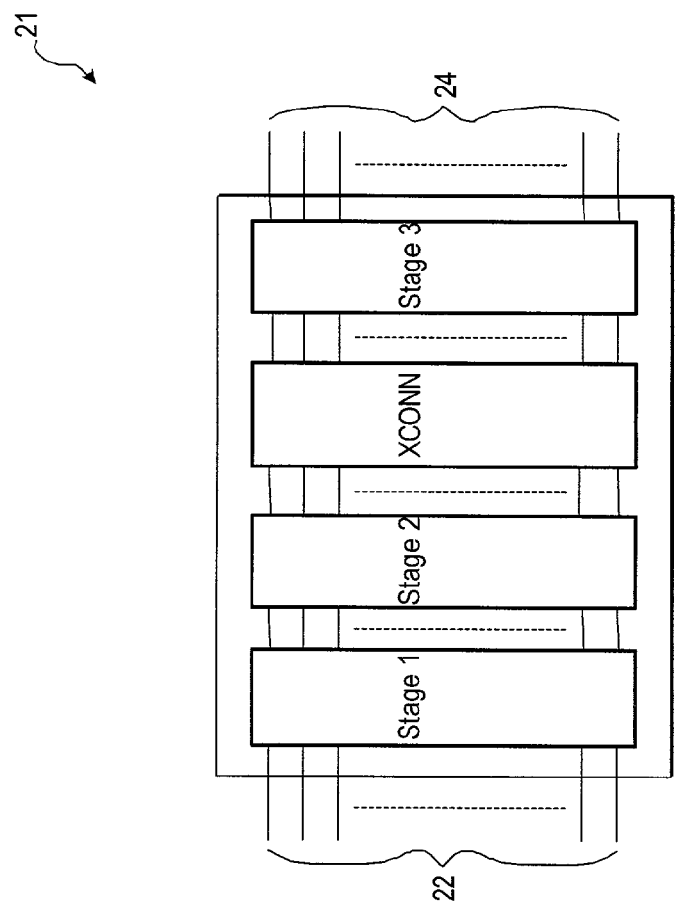
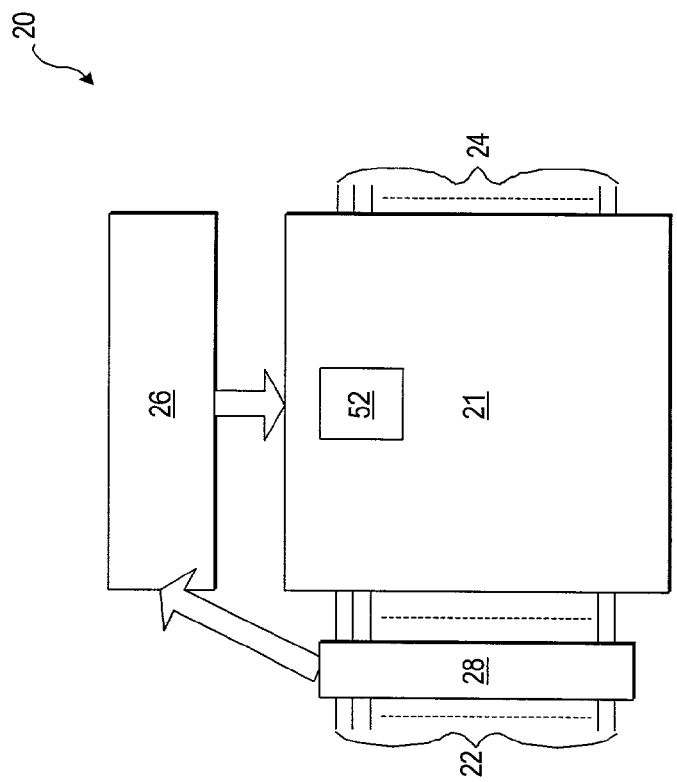
Fig. 2b
Fig. 2a

SWITCH MODEL COMPONENT

FIELD OF THE INVENTION

The present invention relates to switching apparatus. In particular, the invention relates to an apparatus for modelling a plurality of switching operations.

BACKGROUND TO THE INVENTION

An important parameter by which telecommunications apparatus are measured is the ability to restore traffic quickly in the event of a fault. This is normally achieved by protection switching. A protection switch is arranged to select one of, typically, two available inputs. When an input is selected, the traffic received on that input is passed on by the protection switch. When a fault is detected in respect of the selected input, the protection switch selects the other available input. Moreover, it is common for telecommunications apparatus to comprise more than one layer of protection switching. As a result, the connections between respective inputs and outputs of a telecommunications apparatus may depend on the respective settings of more than one protection switch.

Telecommunications apparatus is becoming increasingly complicated and are typically required to handle a very large number, typically thousands, of input and output traffic data signals. Accordingly, a typical telecommunications apparatus may be required to implement thousands of protection switches. The respective settings of these protection switches must be determined before the connections between the inputs and outputs of the telecommunications apparatus can be configured.

A problem here is that, in order to conform with industry standards such as ITU-T (International Telecommunications Union Telecommunications Standardization Sector) and Telcordia standards and customer expectations, protection switching must be performed within relatively strict time limits. Moreover, these time limits are expected to be met irrespective of the number of switching operations that need to be implemented. It is thus becoming increasingly difficult to perform the necessary switching operations, determine the setting of the protection switches and configure the connections between inputs and outputs within the time limits stipulated by industry standards.

This is a particular problem where it is desired to implement the required switching operations in a single core or microchip (sometimes referred to a single stage switch or monolithic switch). In such a switch, all of the necessary switching operations are performed in a single stage normally under the control of computer software. The computer software therefore tends to be relatively complex and slow.

SUMMARY OF THE INVENTION

A first aspect of the invention provides an apparatus for modelling a plurality of switching operations arranged in a plurality of switching stages, the apparatus comprising at least one respective switch stage component for each switching stage, each switch stage component comprising one or more respective addressable switch state indicators for each switching operation associated with the respective switching stage, wherein the value of the or each switch state indicator in one or more of said switch stage components identifies a respective switch state indicator in another switch stage component and wherein the switch stage components are interconnected such that addressing a switch state indicator in one switch stage component causes the respective identified switch state indicator to be addressed.

In the preferred embodiment, the apparatus is associated with a switch core having a plurality of inputs and a plurality of outputs, the apparatus comprising a first switch stage component and a final switch stage component, wherein the respective switch state indicators of the final switch state component correspond with a respective output and the respective values of the switch state indicators of said first switch stage component identify a respective input.

The apparatus significantly reduces the time taken to configure or reconfigure the switch core when protection switching is required.

Preferably, the apparatus further comprises one or more intermediate switch stage components between said first and final switch stage components, wherein the respective values of the switch state indicators of said one or more intermediate switch stage components identify a respective switch state indicator of a preceding intermediate switch stage component or of said first switch stage component.

A second aspect of the invention provides a switching apparatus comprising a switch core having a plurality of inputs and a plurality of outputs, the apparatus further comprising an apparatus for modelling a plurality of switching operations according to the first aspect of the invention.

A third aspect of the invention provides a network element comprising a switching apparatus according to the second aspect of the invention.

A fourth aspect of the invention provides a transport network comprising one or more network elements according to the third aspect of the invention.

A fifth aspect of the invention provides a method of modelling a plurality of switching operations arranged in a plurality of switching stages using an apparatus comprising a respective switch stage component for each switching stage, each switch stage component comprising a respective addressable switch state indicator for each switching operation associated with the respective switching stage, the method comprising addressing a switch state indicator in one of said switch stage components and using the value of the addressed switch state indicator to address a switch state indicator in another switch stage component.

A sixth aspect of the invention provides a method of protection switching using an apparatus for modelling a plurality of switching operations arranged in a plurality of switching stages comprising a respective switch stage component for each switching stage, each switch stage component comprising a respective addressable switch state indicator for each switching operation associated with the respective switching stage, the method comprising addressing a switch state indicator in one of said switch stage components and using the value of the addressed switch state indicator to address a switch state indicator in another switch stage component.

A seventh aspect of the invention provides a computer program product comprising computer useable instructions for creating an apparatus according to the first aspect of the invention. The computer program product may for example take the form of hardware description language, such as VHDL, or a netlist.

Preferred features of the invention are set out in the dependent claims. Other advantageous aspects and features of the invention will be apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art.

BRIEF DESCRIPTION OF THE DRAWINGS

Embodiments of the invention are now described by way of example and with reference to the accompanying drawings in which:

FIGS. 2a and 2b show schematic views of a switching apparatus;

DETAILED DESCRIPTION OF THE DRAWINGS

Figure 1:
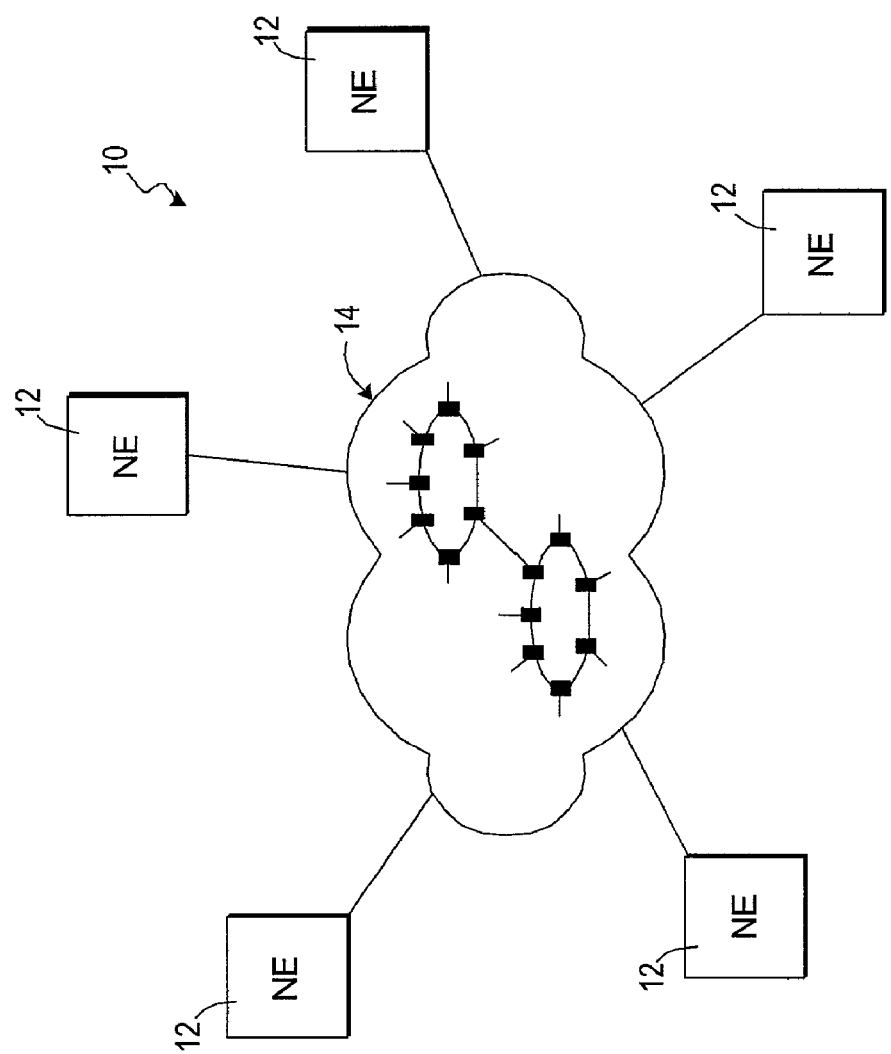
FIG. 1 is a schematic view of a transport network.

FIG. 1 of the drawings shows, generally indicated at 10, a transport network comprising a plurality of network elements 12 in communication with one another via a network infrastructure 14. The network infrastructure 14 may comprise further network elements or nodes, and/or sub-networks, arranged in conventional network configurations such as ring configuration, hub configuration, mesh configuration, point-to-point configuration, or a combination thereof. The network elements 12 typically comprise telecommunications apparatus, or transmission apparatus, such as a router, a switch, a multiplexer, a regenerator or a cross-connect (not shown), or a combination of these. The network 10 may, for example, comprise a synchronous transport network, or synchronous transmission system, such as a SONET and/or SDH network. In this case, the transmission apparatus are commonly known as synchronous transmission apparatus. Many synchronous transmission apparatus, including multiplexers, routers and cross-connects, comprise switching apparatus and the present invention may best be described in the context of a switching apparatus.

FIG. 2a shows a schematic view of a switching apparatus, generally indicated at 20. The switching apparatus 20 may form at least part of a synchronous transmission apparatus (not shown) or network element 12. The switching apparatus 20 comprises a switch device, or switch core 21, for example a SONET STS (Synchronous Transport Signal) switch (or equivalent high order switch), arranged to receive a plurality of inputs 22 and provide a plurality of outputs 24. It will be understood that the inputs 22 and outputs 24 do not necessarily correspond one-to-one with physical input ports, output ports or input/output (I/O) ports of the switching apparatus 20 or of the synchronous transmission apparatus with which they are associated. A physical input port, output port or I/O port may send and/or receive data signals on one or more inputs 22 and/or outputs 24, depending on the capacity of the port and on the size of the data signal. In SDH and SONET systems, the inputs 22 and outputs 24 are commonly referred to as timeslots such that, for example, a particular input 22 may correspond to a respective timeslot on a particular port.

The main function of the switch core 21 is to cross-connect the inputs 22 and outputs 24 so that traffic, or data signals, arriving at a given input 22 are output from the switch core 21 at one or more appropriate respective outputs 24. The configuration of the switch core 21 is determined by the contents of a table or connection map 52 which identifies which input 22 is connected to which output 24. As shown in FIG. 2a, the map 52 normally resides in the switch core 21 and typically takes the form of RAM (Random Access Memory) or other suitable memory. FIG. 2a shows the switch core 21 as a single stage switch implemented as a single component, for example a single microchip. Single component switches are sometimes referred to as monolithic switches. The present invention has particular relevance to single stage switches.

The switching apparatus 20 further includes a control module 26. The control module 26 usually comprises computer software embedded in a microcontroller or microprocessor. The control module 26 is programmable to configure the appropriate cross-connections between inputs 22 and outputs 24 and so to configure the switch core 21. Typically this is achieved by way of assigning one or more inputs to a respective one or more outputs. In order to determine which input(s) need to be connected to which output(s), the control module 26 needs to take into account what protection switching, if any, the switching apparatus 20 is required to make. Typically, this is achieved with the assistance of an interface module 28. The interface module 28 is arranged to, amongst other things, examine or monitor each data signal received at the inputs 22 and to communicate information relating to the status of the data signals to the control module 26. The status information comprises information relating to faults detected in respect of the data signals received at the inputs 22. For example, the status information may indicate whether a respective data signal is non-faulty, i.e. no protection switching is required in respect of the signal, or faulty, i.e. protection switching is required in respect of the signal. The evaluation of whether a signal is faulty or non-faulty may be made on one or more different parameters including level of bit error rate in the signal (or other signal degradation), loss of signal (usually indicated by an Alarm Indicator Signal (AIS)), or signal mis-direction. The interface module 28 may therefore be arranged to signal to the control module 26 either that a signal received on an input 22 is either "faulty" or "non-faulty", and/or may provide other parameters that allow the control module 26 to determine whether or not it is necessary to perform a protection switching operation (sometimes referred to as a protection switching event). Examples of functions that may form part of the interface module 28 are described in ITU-T standards G.783 and G.806 in the context of SDH networks and include the RSn_TT, MSn_TT, Sn_TT, Sm_TT, Snm_TT, Smm_TT, Sns_TT and Sms_TT functions.

Once the control module 26 has received all of the relevant status information from the interface module 28, it determines what protection switching is required and then configures the cross-connection between inputs 22 and outputs 24 of the switch core 21 accordingly. However, the switching apparatus 20 may receive thousands of data signals at a time and may be required to implement more than one protection switching scheme. As a result, the amount of computation required by the control module 26 to determine the appropriate switch configuration is relatively high. It is increasingly difficult, therefore, to devise a control module 26 which is able to configure the switch core 21 quickly enough to meet the industry standards laid down for protection switching (for example ITU-T G.783 and G.841) as well as customer expectations.

FIG. 2b shows a model of the switch core 21 and in particular a model of the switching operations that the switch core may be required to make. In FIG. 2b it is assumed, for illustration purposes only, that the switching apparatus 20 is required to implement a section protection switching scheme, such as BLSR (Bi-directional Line Switched Ring, as specified in the Telcordia GR-1230-CORE standard), and a path protection switching scheme, such as UPSR (Unidirectional Path Switched Ring, as specified for example in Telcordia GR-1400-CORE standard). To implement the section protection switching, the switching apparatus 20 is required to implement two or more stages, or layers, of switching operations represented in FIG. 2b as two stages, namely stage 1 and stage 3. To implement the path protection switching, the switching apparatus is required to implement a further one or more stage, or layer, of switching operations indicated as one stage, namely stage 2. Each stage 1, 2 and 3 represents a respective set of protection switching operations, or protection switches, that are required to implement the respective protection switching schemes. The switch core 21 does not normally comprise physical switches corresponding to the switching operations, or protection switches, of each stage 1 to 3. The protection switches represented by stages 1, 2 and 3 may therefore be considered as virtual switches and are implemented by the programming of the control module 26 and the configuration of the map 52. As is normal, the switch core 21 also performs cross-connect operations corresponding to the normal operation of the switching apparatus 20 i.e. the switching that the switching apparatus 20 is required to perform over and above any protection switching that is required. In FIG. 2b, the normal cross-connect operations are represented by a fourth stage, or layer, annotated as XCONN. It will be noted that the arrangement of FIG. 2b is provided by way of example only and that, in practice the number and arrangement of switching stages will depend on, amongst other things, the number and type of protection switching schemes that the switching apparatus 20 is required to implement.

In order to determine which inputs 22 must be connected to which outputs 24 during any given period, the control module 26 must determine the respective settings of the protection switches, or virtual protection switches, in each of stages 1, 2 and 3. Moreover, the control module 26 must take into account the respective setting of all of the stages 1, 2 and 3 when determining how to connect an input 22 to a given output 24. Thus, for each output 24, the control module 26 traces a path back through a model or map of each stage of the switch core 21 to determine the, or each, appropriate input 22. The configuration of the XCONN stage may be assumed to be constant for the purposes of the present illustration, although this configuration is changeable—typically at the behest of a (human) network operator (not shown) via the control module 26—if it is desired to change the normal switching operations performed by the switch core 21 (this is sometimes known as a "connection time event" whereas the protection switching operations are sometimes known as "protection time events").

Conventionally, the control module 26 is programmed with a model of the stage 1, 2 and 3 protection switches and with the protection switching schemes that require implementation. Upon receipt of the relevant data signal status information from the interface module 28, the control module 26 determines the appropriate configuration for cross-connecting the inputs 22 and outputs 24. This is a computationally intensive task which can take a relatively long time to perform.

The present invention reduces the amount of time taken to determine the appropriate configuration of the switch core 21, and in particular reduces the time taken to implement protection time events, as is now described.

Figure 3:
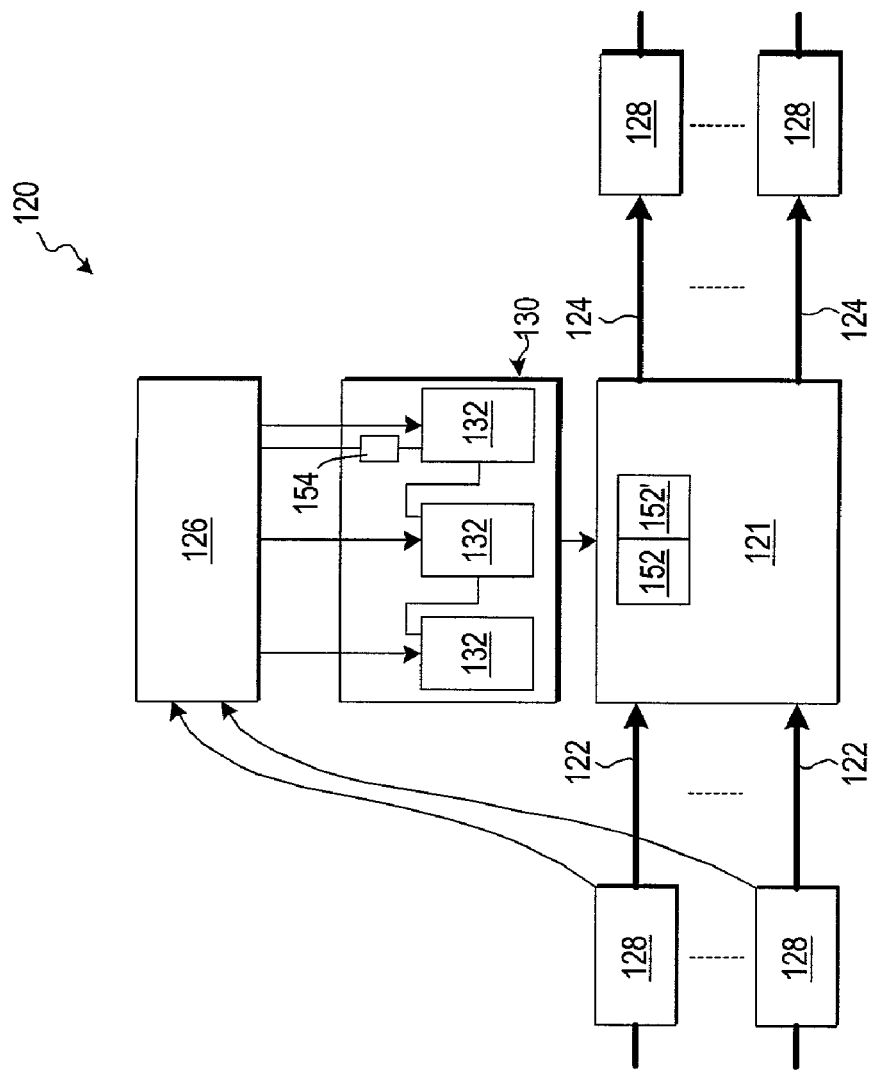
FIG. 3 is a schematic view of a switching apparatus including an apparatus for modelling a plurality of switching operations in accordance with a preferred embodiment of the invention.

FIG. 3 shows a schematic view of a switching apparatus, generally indicated at 120, arranged in accordance with a preferred embodiment of the present invention. The switching device 120 comprises a switch core 121 having a plurality of inputs 122 and a plurality of outputs 124 (only two of each shown), the switch core 121 being substantially similar to the switch core 21 of FIG. 2. The switch core 121 includes, or has access to, a connection map 152 the contents of which determines the how the inputs 122 and outputs 124 are interconnected. In FIG. 3, a stand-by map 152' is also shown and is described in more detail below. In the preferred embodiment, the switch core 121 is particularly suited for switching data signals comprising high order data structures (for example, SDH VC-4s or SONET STS SPEs) and comprises a high order switch, such as an STS switch, or equivalent high order switch. It is also preferred that the switch core 121 comprises a single stage switch. Also shown in FIG. 3 are interface modules 128, a respective interface module 128 being associated with a respective input 122. It will be noted that a single interface module 128 may associated with one or more inputs 122 or outputs 124. The switching apparatus 120 further includes a control module 126 comprising, for example, computer software embedded in a microprocessor or microcontroller. As for the switching apparatus 120 of FIG. 2a, the interface modules 128 associated with inputs 122 are arranged to communicate to the control module 126 information relating to the status of the traffic, or data signals, received on the respective input 122.

In accordance with one aspect of the invention, the switching apparatus 120 further includes an apparatus for modelling a plurality of switching operations in the form of a switch model component 130. The switch model component 130 comprises a respective switch stage component for one or more of the switching stages, or layers, to be implemented by the switch core 121. In the present example, it is assumed that the switching apparatus 120 is required to implement three protection switching stages, stages 1, 2 and 3, and one cross-connection stage XCONN, as illustrated in FIG. 2b. In the preferred embodiment, the switch model component 130 is required to model only the protection switching stages 1, 2 and 3. Thus, the switch model component 130 comprises three switch stage components, namely a first switch stage component 132, an intermediate switch stage component 134, and a final switch stage component 136 corresponding to switching stages 1, 2 and 3 respectively. For the purposes of clarity, in this example the configuration of the XCONN stage is assumed to be constant and the cross-connection stage XCONN is not represented in the switch model component 130. In practice, the XCONN stage may be implemented by one or more additional switch stage components (not shown). For example, to implement the XCONN stage of the arrangement shown in FIG. 2b, an additional switch stage component may be inserted between the intermediate and final switch stage components 134, 136.

The switch stage components 132, 134, 136 each represent a respective switching stage 1, 2, 3 and, in particular, include respective switch state indicators 150 (not shown in FIG. 2) for representing the respective settings of the switches (in this case protection switches), or switching operations, that are associated with the respective switching stages 1, 2, 3. Preferably, each switch stage component 132, 134, 136 comprises one or more programmable data memory providing a respective memory location for each switch (in this case protection switch), or switching operation, associated with the respective switching stage 1, 2, 3. The respective memory locations are arranged to store a respective switch state indicator 150, the value of which indicates the setting of the respective switch, or switching operation. Any suitable memory device may be used to implement the required data memories, and it will be appreciated that a single memory device may be used to implement more than one data memory. In the preferred embodiment, however, each switch stage component 132, 134, 136 takes the form of one or more look-up tables (LUT). Each LUT may conveniently be implemented by, for example, a respective random access memory (RAM), preferably a dual port, or two port RAM (although it will be understood that a single RAM may implement more than one LUT). Preferably, the switch stage components 132, 134, 136 are provided on a programmable logic device, such as an FPGA (Field Programmable Gate Array), or an ASIC (Application Specific Integrated Circuit). In such cases, internal FPGA RAMs may be used to implement the LUTs 132, 134, 136.

Each LUT 132, 134, 136 comprises an entry for each protection switch, or protection switching operation, that the respective switching stage 1, 2, 3 is required to implement. Each entry comprises a respective switch state indicator 150 the value of which indicates the setting of the respective protection switch. In the following illustration, each protection switch may adopt one of two settings, or states, (depending on which of the two available inputs is selected by the protection switch) and so the indicators 150 may take one of two values. In practice, however, each switching operation may be able to adopt more than two states and so the switch state indicators may take one of more than two values. It will be understood that the available "inputs" to a protection switch need not necessarily correspond to inputs 122 of the switch core 121.

The control module 126 is arranged to set and update the values of the indicators 150 in each LUT 132, 134, 136 to correspond with the required setting of the respective protection switch, or switching operation. In respect of each entry in the LUTs 132, 134, 136, therefore, the control module 126 is programmed with a respective two indicator values. Initially, the control module 126 loads the respective LUT entries with indicator 150 values corresponding to the situation where no protection switching is implemented, that is, wherein each protection switch selects the main (or working) input, rather than the stand-by (or protected) input. Subsequently, in response to traffic status information received from the interface modules 128, the control module is arranged to determine what protection switching, if any, is required in respect of one or more of the data signals received at one or more of the inputs 122. The control module 126 is arranged to determine which entries of the LUTs 132, 134, 136 need to be changed to implement the required protection switching. This may be implemented by programming the control module 126 to correlate traffic status information with appropriate indicator 150 values for one or more entries in one or more LUT 132, 134, 136. Thus, whenever the control module 126 determines that protection switching is required, it is able to update the relevant LUT entries. Since the switch model component 130 may be seen as a model of the switching stages 1, 2, 3, and the entries in each switch stage component 132, 134, 136 may be seen as representing a respective protection switch, or protection switching operation, then in updating the values of the LUT entries in the manner described above, the control module 126 is effectively changing the state of the relevant protection switches in the switch model component 130. In the present example, each LUT entry can only take one of two respective values since the corresponding protection switches can adopt only one of two states.

The control module 126 may be arranged to update the switch model component 130 in the manner described above each time a fault is reported by an interface module 128, or after a pre-determined number of faults have been reported, or after a pre-determined period of time has elapsed. This will depend on, for example, the complexity of the switch core 121 and/or on industry standard time limits concerning how quickly protection switching must be implemented after a fault occurs.

When the switch stage components 132, 134, 136 are updated, the updated values are then translated into a corresponding cross-connection configuration (commonly known as a connection map) of inputs 122 and outputs 124. In the preferred embodiment this is achieved as follows. Each switch state indicator 150 of the switch stage component 136 that corresponds to the last switching stage (in this example stage 3) is associated with a respective output 124 and thus, referring to the model of FIG. 2b, the respective values of these switch state indicators 150 represent the setting of the protection switch from switching stage 3 that is associated with the respective output 124. The respective values of these switch state indicators 150 are used to identify a respective switch state indicator 150 in the preceding switch stage component (which is component 134 in the present example). The respective values of the switch state indicators 150 of switch stage component 134 are used, in turn, to identify a respective switch state indicator 150 in the preceding switch stage component (which is component 132 in the present example). The respective values of the switch state indicators 150 of switch stage component 132, being the first switch stage component and representing the first switch stage (stage 1) in the model of FIG. 2b, each identify a respective input 122. This may be appreciated by considering that each switch state indicator 150 in the first switch stage component 132 represents a respective protection switch which, being in the first stage of protection switching, is arranged to select one of two available inputs 122. Thus, since the value of the switch state indicator 150 represents the state of the corresponding protection switch, it also identifies the selected input 122.

Hence, for each output 124, a trail is followed from the last switch stage component (component 136 in this example) to the first switch stage component (component 132 in this example), whereupon the value of the switch state indicator 150 identified in the first switch stage component 132 identifies the input 122 to be cross-connected with the respective output 124. Using this information the map 152, which correlates each output 124 with an appropriate input 122, may be constructed or updated. Thus, for each signal path an input 122 and output 124 is determined and stored, conveniently in the map 152, and the contents of the map 152 are used to program, or configure, the switch core 121 in conventional manner. As mentioned above, in practice there may be a further switch stage component, conveniently in the form of a further LUT (not shown), between LUT 134 and LUT 136 for implementing the XCONN switching stage, connected to the adjacent LUTs 134, 136 in the same manner as described above. Because the XCONN switching operations are assumed to be constant during protection time events (i.e. the XCONN LUT is not updated by the control module 26 as a result of protection time events), the XCONN LUT serves as a fixed relay between LUTs 134, 136.

In the preferred embodiment, the arrangement described above is implemented as follows. The switch model component 130 further comprises, or is co-operable with, an indexing device in the form of a counter 154. The output of the counter 154 is connected to the address input (not shown) of the LUT 136. The data output (not shown) of the LUT 136 is connected to the address input (not shown) of LUT 134 and the data output (not shown) of LUT 134 is connected to the address input (not shown) of LUT 132. Thus, as the counter 154 increments, it addresses, or indexes, the entries of LUT 136 (i.e. the respective state switch indicators 150) in succession. Each time the counter addresses an entry in LUT 136, the contents of that entry (being the value of the respective switch state indicator 150) is used to address the preceding LUT 134. Similarly, the contents of the entry addressed in LUT 134 is used to address the preceding LUT 132. The contents of the entry addressed in LUT 132 identifies the input 122 to be connected to the output 124 which corresponds with the entry in LUT 136 that is currently addressed by the counter 154. The counter 154 addresses each entry of LUT 136 in turn so that the connection map 152 may be produced. It will thus be seen that, when the memory locations in the LUTs are viewed as representations of respective protection switches, the address of a memory location relates to the output of the respective protection switch while the contents of the memory location (i.e. the value of the switch state indicator 150) relates to the respective input of the protection switch that drives the output of the protection switch. In the preferred embodiment, the operation of the counter 154 is initiated, conveniently by the control module 126, whenever the control module 126 determines that a protection event is required (i.e. that a protection switching operation is required). Once initiated the counter 154 indexes each of the memory locations 140 in LUT 136 so that the entire connection map 152 may be updated. While a new connection map 152 is being generated, the control module may determine that further protection switching operations are required, in which case the counter 154 begins its operation again.

It is preferred that a stand-by map 152' is used in addition to the map 152 (sometimes known as the active map 152). The stand-by map 152' is substantially similar to the map 152 and conveniently resides in the switch core 121 (although it may equally be provided externally of the switch core 121). The active map 152 is the map that is actually used at a given time to determine the interconnections between inputs 122 and outputs 124. While the active map 152 is being used, the stand-by map 152' is being updated in response to the occurrence of protection switching operations. Preferably, once the stand-by map 152' has been updated, the roles of the active and stand-by maps 152, 152' is alternated so that the active map 152 becomes the stand-by map 152' and vice versa. The stand-by map 152' may be updated by the control module 126 (in which case the switch model component 130 is arranged to communicate to the control module 126 the contents of the each memory location 140 addressed in the first LUT 132 together with identification of the corresponding output 124). Preferably, however, the switch model component 130 is arranged to update the stand-by map 152' directly. Conveniently, this may be achieved by arranging the structure of the LUTs 132, 134, 136 to correspond with the structure of the stand-by map 152' such that the respective address of a memory location in LUT 136 (which corresponds to a respective output 124) may also be used to address a corresponding memory location in the stand-by map 152' (also corresponding to the same respective output 124). Thus, the switch model component 130 may be arranged, when addressing a memory location 140 in LUT 136, to also address the corresponding memory location in the stand-by map 152' (using, for example, the output of counter 154) and to connect the output of LUT 132 to the stand-by map 152' such that the value contained in the addressed memory location 140 of LUT 132 is written to the corresponding memory location of the stand-by map 152'.

FIGS. 4 to 7 illustrate some basic example operations of the switch model component 130. FIG. 4a shows a representation of the switch model component, generally indicated at 130'. Three switch stage components (assumed to comprise a respective LUT in this example) are shown at 132', 134', 136'. It is assumed for illustrative purposes only that the switch model component 130' is required to model a switch core (not shown) having eight inputs 122' and eight outputs 124' (each input 122' and output 124' is numbered 1 to 8 in FIG. 4a). Each LUT 132', 134', 136' includes a plurality of memory locations 140, one in respect of each protection switch (not shown in FIG. 4a) associated with the respective LUT 132', 134', 136'. The values shown in the memory locations 140 represent the switch state indicators 150.

Figure 4A:
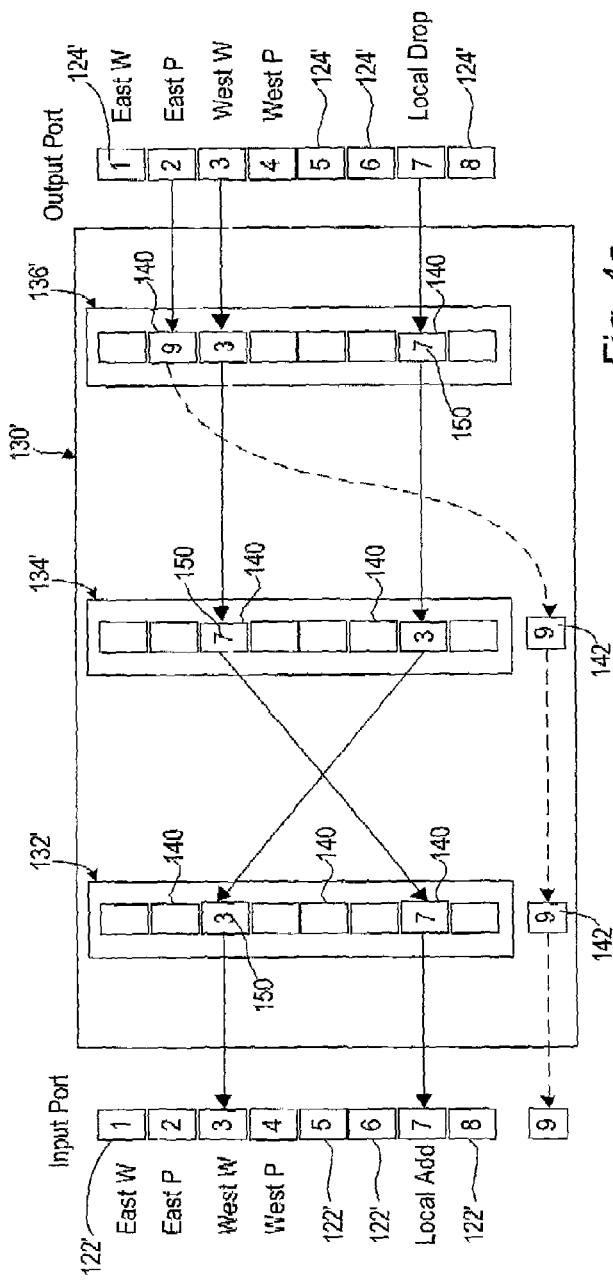
FIGS. 4a to 4c illustrate a first example operation of the apparatus of FIG. 3.
Figure 4C:
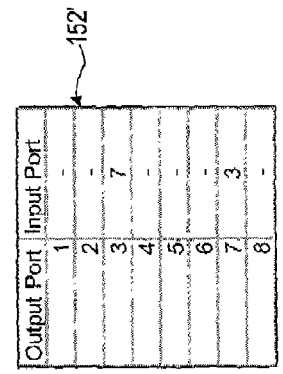
Figure 4B:
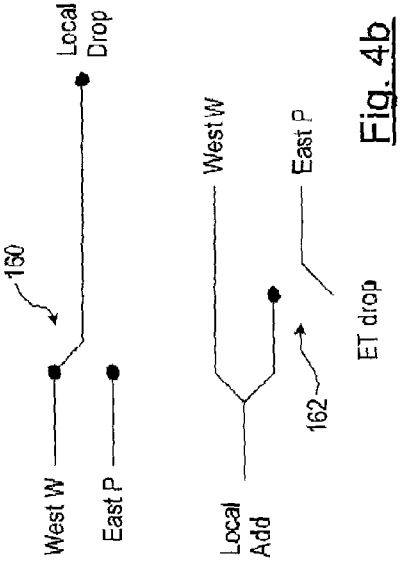

FIG. 4b shows two protection switches 160, 162 that form part of a protection scheme that the overall switching apparatus 120 (not shown in FIG. 4) is required to implement. In this example, it is assumed that protection switches 160, 162 form part of a BLSR protection switching scheme and that a representation of protection switch 160 is included in the first LUT 132', while a representation of protection switch 162 (known in BLSR as a protection bridge) is included in the third LUT 136'. In FIG. 4b, the inputs 122' associated with switch 160 are labelled as West Working (West W) and East Protection (East P), while the output 124' associated with switch 160 is labelled as Local Drop. Thus, the setting of switch 160 determines whether the data signal carried on West Working or the data signal carried on East Protection is output to the Local Drop. These labels are also used in FIG. 4a from which it will be seen that protection switch 160 is represented in FIG. 4a by the third memory location 140 (counting from top to bottom as viewed in FIG. 4a) of the first LUT 132' and that the switch state indicator 150 stored in this memory location 140 may take a value identifying either input 2 or input 3 depending on whether the switch 160 selects East Protection or West Working respectively.

Similarly, the input 122' associated with protection bridge 162 is labelled as Local Add and the associated output 124' is labelled as East Protection. Thus, the setting of protection bridge 162 determines whether or not the data signal on the Local Add path is output on West Working only, or on both West Working and East Protection. In FIG. 4a, protection bridge 162 is represented by the second memory location 140 (counted from top to bottom as viewed in FIG. 4a) since this protection bridge 162 is associated with output 2 (East P). The switch state indicator 150 may take a special value (described in more detail below) to indicate that East Protection is not used (i.e. that the protection bridge 162 is open), or a value which indicates that bridge 162 is closed (thereby indicating that Local Add is delivered to East Protection) and which may be used to address the appropriate memory location 140 in the preceding LUT 134'. Since the switch state indicator 150 in the second memory location 140 of LUT 136' must take a value and since, when the protection bridge 162 is open, the value should not cause an entry in LUT 134' to be addressed which corresponds to a protection switch, a special value is used. Preferably, the special value causes an additional entry 142 in LUT 134' to be addressed. The additional entry 142 in LUT 134' holds a similar special value which, in turn, causes an additional entry 142 in LUT 132' to be addressed. The additional entry 142 in LUT 132' holds a similar special value which indicates an association with a notional, or dummy, input 125. The arrangement is such that association with the notional input 125 is deemed to indicate that the bridge 162 is open. In FIG. 4a, the special value is shown as '9' by way of example only. More than one dummy inputs may be provided to indicate conditions such as AIS (Alarm Indication Signal) or unequipped signal.

It will be noted that, in FIG. 4b, it is assumed for reasons of simplicity that there are no other protection switches between the switch 160 and the Local Drop output or between the inputs (West W and East P) and the switch 160. This means that the seventh memory location 140 in the third LUT 136' and the seventh memory location 140 in the second LUT 134' do not represent protection switches but merely serve as relays, or fixed pointers, to the first LUT 132'. Accordingly, the values held in these memory locations would not change during operation of the switching apparatus as a result of protection switching. Similarly, it is assumed that there are no further protection switches between protection bridge 162 and the Local Add input and so the seventh memory location 140 of the first LUT 132' and the third memory location 140 of the second LUT 134' serve as relays or fixed pointers. In practice, depending on which protection schemes are to be implemented, one or more of these relay memory locations 140 may represent a switch and so may take one of two (or more) values.

The situation shown in FIG. 4a and 4b corresponds to the idle state of the BLSR protection scheme i.e. no BLSR protection switch is taking place (it will be noted that in such circumstances the only switching implemented by the switch core 121 relates to the cross-connect function XCONN). In order to determine which inputs 122' must be connected to which outputs 124', the control module 126 causes the counter 154 to address the memory locations 140 in the third (and final) LUT 136' in turn. When the counter 154 addresses the third memory location 140 (which corresponds to output 3 (West W)), the value of the corresponding switch state indicator 150 is used to address the preceding LUT 134'. In this example, the value is '3' and so the memory location '3' of LUT 134' is addressed (in the illustrated example this is assumed to be the third memory location 140 of LUT 134' counting from the top as viewed in FIG. 4a). The value of the switch state indicator 150 of said third memory location 140 is '7' and so the seventh memory location 140 of the first LUT 132' is now addressed. The value of the addressed switch state indicator 150 in the first LUT 132', which in this example is '7', identifies the input 122' which must be connected to the relevant output 124', namely output 7 (Local Add). This information is then stored in the stand-by map 152' as described above.

Similarly, when the memory location 140 of LUT 136' corresponding to output 7 is addressed, the value '7' is found, which value then causes memory location '7' of the second LUT 134' to be addressed, upon which the value '3' is found and so memory location '3' of the first LUT 132' is addressed. Memory location '3' of LUT 132' contains the value '3' thereby identifying input 3 (West W) as the input which must be connected to output 7. Again this information is stored in the stand-by map 152'.

FIG. 4c shows a representation of the stand-by map 152' which includes, in respect of each output 124', a respective field for identifying the input 122' which must be connected thereto. It will be seen that in the input fields for outputs 3 and 7, inputs 7 and 3 are identified respectively. Thus, to implement the switching arrangement shown in FIG. 4b, input 3 of the switch core 121 in connected to output 7, and input 7 is connected to output 3. For each memory location 140 in the third LUT 136' that contains a null indicator, a null value is written to the corresponding input field of the stand-by map 152' to indicate that the corresponding output 124' does not require connection. Once the stand-by map 152' is complete, it may then be used as the active map 152.

Figure 5A:
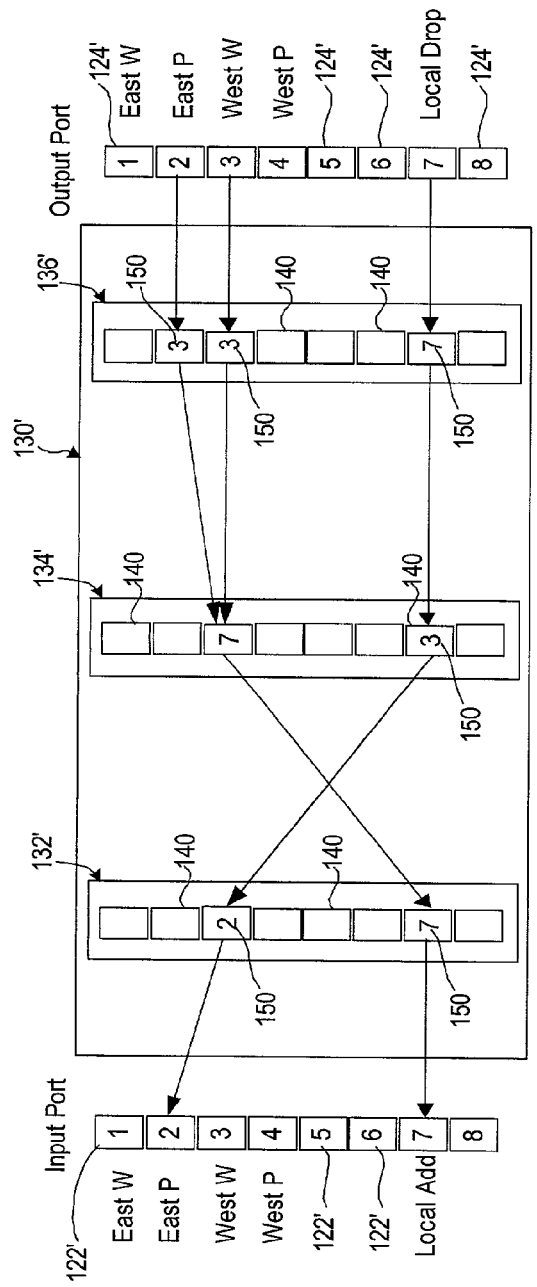
FIGS. 5a to 5c illustrate a second example operation of the apparatus of FIG. 3.
Figure 5C:
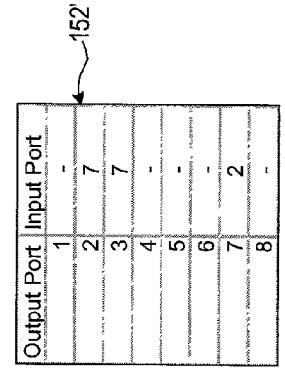
Figure 5B:
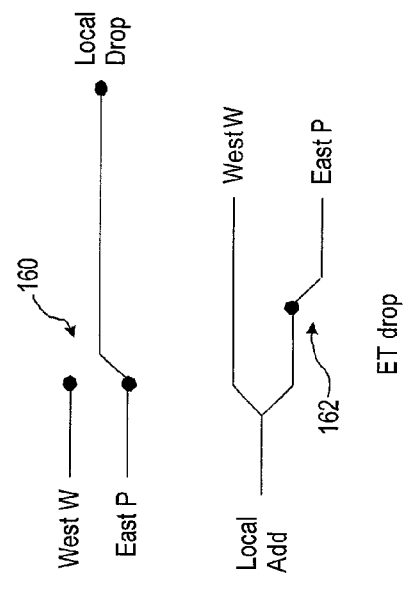

FIGS. 5a to 5c relate to the same switch model component 130' as FIGS. 4a to 4c. In FIGS. 5a to 5c, however, it is assumed that each of protection switches 160, 162 adopts its alternative state. This is shown in FIG. 5b from which it will be seen that protection switch 160 now causes the data signal on the East P path to be output to Local Drop, while protection bridge 162 now causes the data signal on Local Add to be output on both the West W and East P paths. In BLSR terminology, this is known as the bridged and switched state. The changes in the states of switches 160, 162 is reflected in the switch model component 130' of FIG. 5a. In particular, the value of the switch state indicator 150 in the third memory location of LUT 132' (which represents protection switch 160) is now '2' thereby identifying input 2 (East P) as the input 122' that should be connected to output 7 (Local Drop). Also, the value of the switch state indicator 150 in the second memory location 140 of the final LUT 136' (which represents protection bridge 162) is now '3' and, following the example described above, this identifies input 7 (Local Add) as the input 122' that should be connected to output 2 (East P). Thus, when the counter 154 now indexes through the entries in LUT 136' in the same manner as described above, the resulting stand-by map 152' (as shown in FIG. 5c) includes the mapping of output 2 connected to input 7 and of output 7 being connected to input 2.

It will be appreciated from the foregoing example that BLSR switching operations are performed by re-programming, or updating, the LUTs 132, 136 corresponding to the first and final switching stages respectively (Stage 1 and Stage 3 in FIG. 2b). To facilitate indexing by the counter 154, it is preferred that the memory locations 140 are arranged consecutively in order corresponding to the output 124 with which they are associated. In the preferred embodiment, all of the memory locations 140 in the stage 1 LUT 132 are updated in the event of a BLSR protection switching operation (i.e. the occurrence of a protecting switching operation represented by the stage 1 LUT 132). Similarly, it is preferred that all of the memory locations 140 in the stage 3 LUT 136 are updated in the event of a BLSR bridging operation (i.e. the occurrence of a protecting switching operation represented by the stage 3 LUT 136). NUT (Non-pre-emptable uninterruptable) traffic can be handled by not updating certain locations in the stage 1 and stage 3 LUTs 132, 136.

Figure 6A:
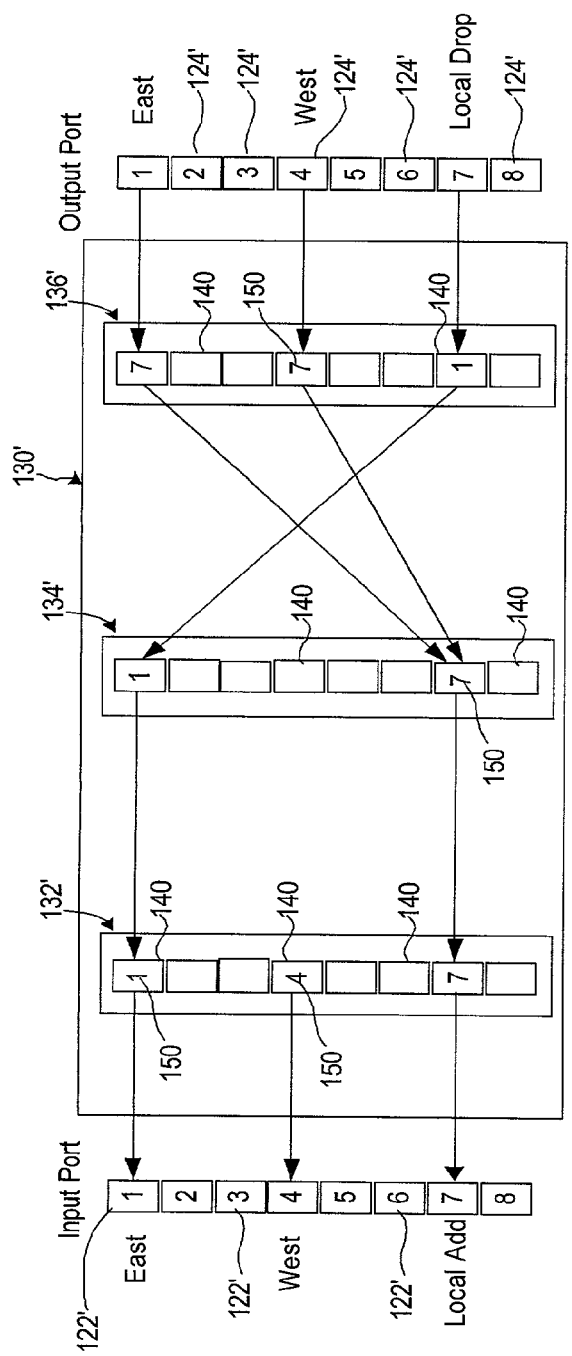
FIGS. 6a to 6c illustrate a third example operation of the apparatus of FIG. 3.
Figure 6C:
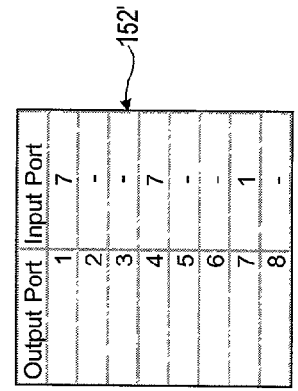
Figure 6B:
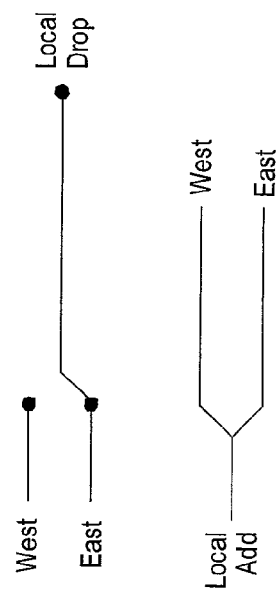

FIGS. 6a to 6c show a further example. FIG. 6b shows a switch arrangement which forms part of a path protection switching scheme known as UPSR. The switch arrangement includes a protection switch 164 arranged to select either the East or West input paths for output to a Local Drop connection (this is known as UPSR closure). Also included in the UPSR scheme is a non-switched, or fixed, arrangement whereby a data signal received from a Local Add connection is supplied to both West and East output paths (known as UPSR bridging). The arrangement shown in FIG. 6b wherein the protection switch 164 selects the East path is known as East Working.

In FIG. 6a, the East and West input paths are associated with, for illustrative purposes only, inputs 1 and 4 respectively, while the Local Drop connection is associated with output 7. The Local Add connection is associated with input 7, while the East and West output paths are associated with outputs 1 and 4 respectively. In the example, it is assumed that path protection switches are represented by the second LUT 134'. Thus for illustrative purposes it is assumed that protection switch 164 is represented by the first memory location 140 (i.e. the top memory location as viewed in FIG. 6a) of LUT 134'.

Figure 7A:
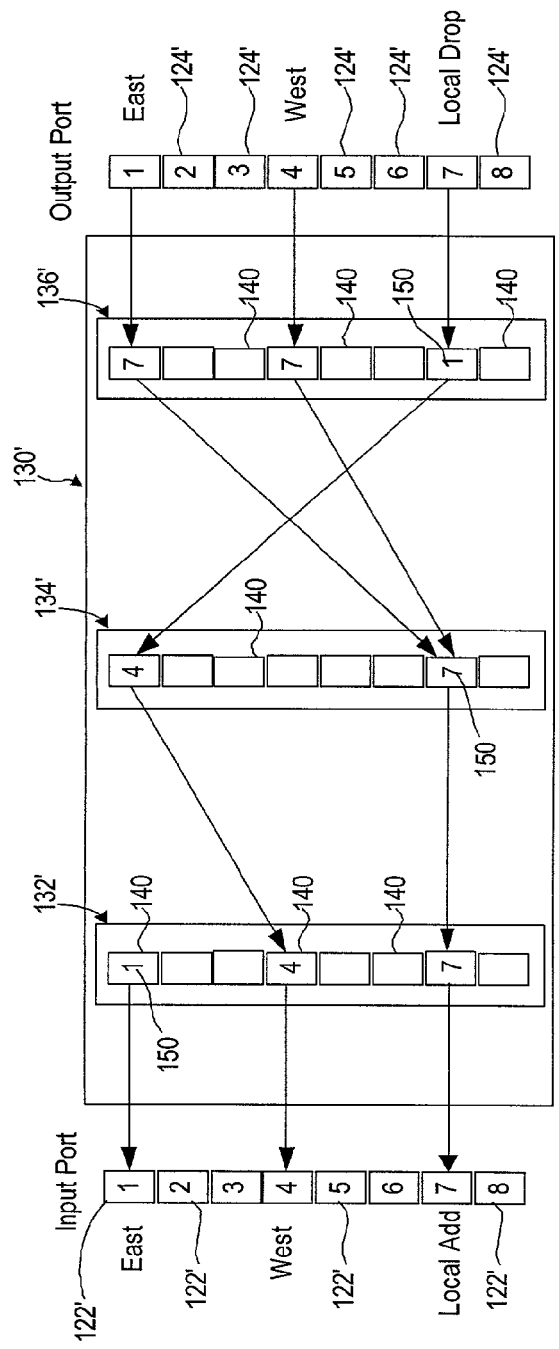
FIGS. 7a to 7c illustrate a fourth example operation of the apparatus of FIG. 3.
Figure 7B:
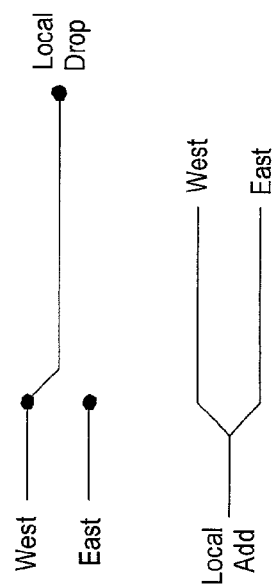
Figure 7C:
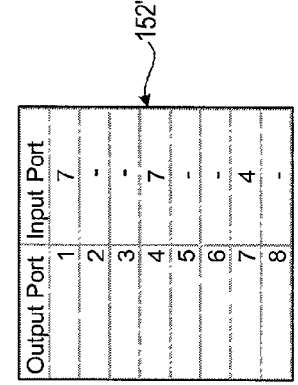

FIGS. 7a to 7c relate to the same switch model component 130' as FIGS. 6a to 6c but in the situation where the protection switch 164 selects the West input path (this is known as West working).

The operation of the switch model component 130' of FIGS. 6a and 7a may readily be understood by analogy with the description of FIGS. 4a and 5a. In this case, the value of the switch state indicator 150 in the first memory location 140 of LUT 134' may take either the value '1' (as shown in FIG. 6a—East working) or '4' (as shown in FIG. 7a—West working) depending on the setting of protection switch 164. When the switch state indicator 150 takes the value '1', then the memory location '1' of LUT 132' is addressed whereupon input 1 (East path) is identified as the input 122' for connection to output 7. When the switch state indicator 150 takes the value '4', then the memory location '4' of LUT 132' is addressed whereupon input 4 (East path) is identified as the input 122' for connection to output 7. As before, this information is stored in the stand-by map 152'—in FIG. 6c it will be seen that output 7 is mapped to input 1, while in FIG. 7c it will be seen that output 7 is mapped to input 4. It will also be noted that the respective switch state indicators 150 in the memory locations 140 used to identify the fixed connection between outputs 1 (East) and 4 (West) and input 7 (Local Add) remain constant since no switching occurs in respect of this part of the UPSR scheme.

It will be understood that the examples shown in FIGS. 4 to 7 are very simple. In practice, more than one switch is usually encountered in a path or trail between inputs and outputs. For example, it is common to implement both section and path protection switching such that the input which must be connected to a particular output may be one of a plurality of inputs depending on the state of one or more section protection switching operations and on the state of one or more path protection switching operations. Relating this to the three stage switching examples shown in FIGS. 4 to 7, for a given output 124', the respective memory locations 140 of each LUT 132',134',136' which relate to the given input 122', may each represent a protection switch, with the result that the output 124' may be connected to one of four inputs 122', depending on the respective settings of each protection switch and therefore on the respective values of the switch state indicators 150 held in said memory locations 140.

The provision of the switch model component 130, 130' significantly reduces the time taken to configure or reconfigure the switch core 121 when protection switching is required. This is because the computational burden on the software residing in the control module 126 is significantly reduced. In particular, the control module 126 is not required to, in respect of each output of the switch core, evaluate the respective states of all of the protection switching operations that can affect which input(s) must be connected to the respective output. This task is performed by the switch model component 130, 130' which, being hardware rather than software based, is able to perform the task more quickly. For example, in the preferred embodiment illustrated in FIGS. 3 to 7, the time taken to generate or update the map 152 is determined by the time taken for the three LUTs 132/132', 134/134', 136/136' to be addressed in respect of each output 124, 124'.

By way of example, if it is assumed that the LUTs 132, 134, 136 of the preferred embodiment are implemented by one or more internal FPGA RAMs, then to support, say, a 320 Gbit/s SONET STS switch core 6144 memory locations are required, each being 13 bits in size. Assuming that one LUT read operation is performed every two clock cycles (approx. 80 MHz clock), then the execution time (i.e. the time taken to completely fill or update the stand-by map 152') would be approximately 6200×2=12400 clock cycles, or 155 micro seconds.

Figure 8:
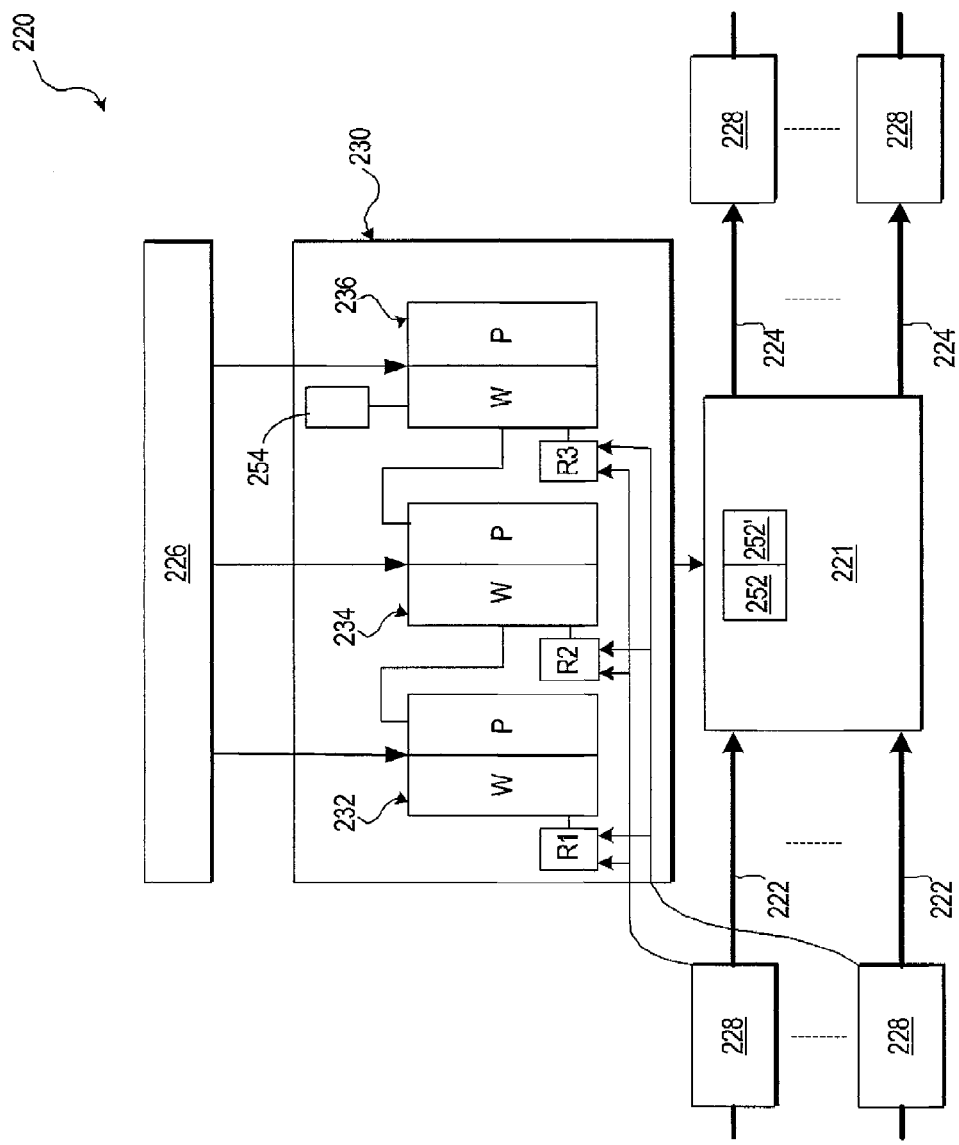
FIG. 8 shows a schematic view of an alternative embodiment of a switching apparatus including an apparatus for modelling a plurality of switching operations.

FIG. 8 illustrates an alternative embodiment of the invention. The switching apparatus 220 shown in FIG. 8 is generally similar to the apparatus 120 shown in FIG. 3 and like numerals are used to indicate like parts. Hence, the switching apparatus 220 comprises a control module 226, a switch model component 230, a switch core 221, containing a map 252 and stand-by map 252', and interface modules 228. The switch model component 230 comprises a first, second and third switch stage components in the preferred form of LUTs 232, 234, 236. As for the FIG. 3 embodiment, LUTs 232, 234, 236 may conveniently be implemented by one or more RAMs, for example internal FPGA RAMs in the case where the switch model component 230 is implemented as an FPGA.

In this embodiment, the role of the control module 226 is further reduced. In particular, the control module 226 is not required to update the LUTs 232, 234, 236 in the event of one or more protection switching operations being required. Rather, each switch stage component holds both values of the respective switch state indicators for each protection switching operation associated with the respective switch stage component. In FIG. 8, each LUT 232, 234, 236 is therefore shown as comprising two sections, A and B, wherein in respect of each switching operation, section A holds a respective indicator value for one switch state (the A indicator) while section B holds a respective indicator value for the other switch state (the B indicator). Associated pairs of A and B indicators (i.e. A and B indicators that relate to the same switching operation) may be stored in consecutive memory locations 240 in the respective LUT 232, 234, 236. Alternatively, each switch stage component 232, 234, 236 may comprise two LUTs, one for holding the A indicators the other for holding the B indicators. By way of example, referring back to FIG. 6, the first memory location of LUT 134' stores a switch state indicator that may take either the value '1' or the value '4' depending on the state of the 'virtual' protection switch 164. In contrast, to represent a similar protection switch the corresponding LUT 234 of the switch model component 230 would hold the value '1' as, say, the A indicator for the protection switch and also the value '4' as the B indicator. Thus, there is no requirement for the control module 226 to re-program the appropriate memory location of the LUT 234 from '1' to '4' and vice versa when implementing a protection switching operation since both of the values '1' and '4' are already stored by the LUT 234. All that is required is means for determining which of the A or B indicators should be read, or output, from the LUT 234 at any given time. To this end, one or more respective registers, or flags, R1, R2, R3 is associated with each switch stage component 232, 234, 236. The settings of the registers R1, R2, R3 determines which of the respective A or B indicators is output, or read, from the respective switch stage component 232, 234, 236. For example, assume that each switch stage component 232, 234, 236 comprises two LUTs, namely a respective LUT A and LUT B, wherein the LUT As hold the respective A indicators and the LUT Bs hold the respective B indicators. Whenever a switch stage component 232, 234, 236 is addressed (either by the counter 254 or by the output from another LUT), it is the setting of the respective register R1, R2, R3 which determines whether LUT A or LUT B is addressed.

For switch stage components that represent path protection switching operations, such as component 234 in FIG. 8, since each path protection switch may change state individually, a respective register R2 is associated with each pair of A and B indicators. In contrast, under a section protection switching scheme such as BLSR, typically a group of protection switching operations occur together. Accordingly, for switch stage components 232, 236 (which are assumed in this example to represent BLSR protection switching operations) a respective register R1, R3 is not normally required for each pair of A and B indicators and, moreover, a single register R1, R3 may be all that is required for each component 232, 236. The setting of the registers R1, R2, R3 is controlled by the interface modules 228 in any convenient manner.

The operation of the switch model component 230 in configuring the maps 252, 252' is substantially similar to that described for FIG. 4 to 7. It will be appreciated that the control module 226 does not play an active role in the normal operation of the switch model component 230. In the preferred embodiment, however, the control module 226 does perform the task of initialising the switch stage components 232, 234, 236 with appropriate A and B indicator values. Once initialised, these values do not change during normal operation but may require updating if a change to the protection scheme being implemented is required. Such updating may also be performed by the control module 226.

It will be understood that the invention is not limited to three switch stage components as illustrated in the foregoing examples. The actual number of switch stage components required will depend on the number and nature of the protection switching schemes being implemented. More than three stages. The invention is described herein in the context of 2-to-1 selector switches, or 2-to-1 switching operations, i.e. switching operations where the switch is able to select one of a possible two inputs. It will be understood that the invention is not limited to such. The invention is not limited the embodiments described herein which may be modified or varied without departing from the scope of the invention.

The invention claimed is:

1. An apparatus for modelling a plurality of switching operations arranged in a plurality of switching stages, the apparatus comprising at least one respective switch stage component for each switching stage, each switch stage component comprising one or more respective addressable switch state indicators for each switching operation associated with the respective switching stage, wherein the value of each of said switch state indicators in one or more of said switch stage components identifies a respective switch state indicator in another switch stage component and wherein the switch stage components are interconnected such that addressing a switch state indicator in one switch stage component causes the respective identified switch state indicator to be addressed.

2. An apparatus as claimed in claim 1, wherein the apparatus is associated with a switch core having a plurality of inputs and a plurality of outputs, the apparatus comprising a first switch stage component and a final switch stage component, wherein the respective switch state indicators of the final switch state component correspond with a respective output and the respective values of the switch state indicators of said first switch stage component identify a respective input.

3. An apparatus as claimed in claim 2, further comprising one or more intermediate switch stage components between said first and final switch stage components, wherein the respective values of the switch state indicators of said one or more intermediate switch stage components identify a respective switch state indicator of a preceding intermediate switch stage component or of said first switch stage component.

4. An apparatus as claimed in claim 2, wherein the respective values of the switch state indicators of said final switch stage component identify a respective switch state indicator of a preceding switch stage component.

5. An apparatus as claimed in claim 2, further including an indexing device arranged to address in turn the switch state indicators of said final switch stage component and wherein, upon being so addressed, the value of the addressed switch state indicator is supplied to another switch stage component thereby addressing a switch state indicator of said other switch stage component.

6. An apparatus as claimed in claim 5, wherein said indexing device comprises a counter.

7. An apparatus as claimed in claim 5, wherein, upon addressing said switch state indicator of said other switch stage component, the value of the addressed switch state indicator is supplied to a further switch stage component thereby addressing a switch state indicator of said further switch stage component.

8. An apparatus as claimed in claim 2, wherein said switch stage components comprise one or more data memory providing a plurality of memory locations, wherein each switch state indicator is associated with one or more respective memory locations and the value of each switch state indicator comprises the contents of each of said respective memory locations.

9. An apparatus as claimed in claim 8, wherein said contents of at least some of each of said respective memory locations comprise a respective address for one or more respective other memory location associated with a respective switch state indicator of another switch stage component.

10. An apparatus as claimed in claim 8, wherein each switch stage component comprises at least one respective Look-Up Table (LUT).

11. An apparatus as claimed in claim 1, wherein said switch stage components hold a single value in respect of each switch state indicator, the value depending on the state of the respective corresponding switching operation.

12. An apparatus as claimed in claim 1, wherein said switch stage components hold, in respect of each switch state indicator, a respective value for each state of the respective corresponding switching operation, and wherein each switch state indicator is associated with a respective flag, the setting of which flag determines which value is used to identify a switch state indicator in another switch stage component.

13. A switching apparatus comprising a switch core having a plurality of inputs and a plurality of outputs, the apparatus further comprising an apparatus as claimed in claim 1.

14. A network element comprising a switching apparatus as claimed in claim 13.

15. A transport network comprising one or more network elements as claimed in claim 14.

16. A method of modelling a plurality of switching operations arranged in a plurality of switching stages using an apparatus comprising a respective switch stage component for each switching stage, each switch stage component comprising a respective addressable switch state indicator for each switching operation associated with the respective switching stage, the method comprising addressing a switch state indicator in one of said switch stage components and using the value of the addressed switch state indicator to address a switch state indicator in another switch stage component.

17. A method of protection switching using an apparatus for modelling a plurality of switching operations arranged in a plurality of switching stages comprising a respective switch stage component for each switching stage, each switch stage component comprising a respective addressable switch state indicator for each switching operation associated with the respective switching stage, the method comprising addressing a switch state indicator in one of said switch stage components and using the value of the addressed switch state indicator to address a switch state indicator in another switch stage component.

* * * * *